(12) United States Patent
Mrlik et al.

(10) Patent No.: US 10,882,412 B2
(45) Date of Patent: Jan. 5, 2021

(54) DEVICES, SYSTEMS, AND RELATED METHODS FOR POWER CONVERSION AND MANAGEMENT

(71) Applicant: INTERTIE, INCORPORATED, Sausalito, CA (US)

(72) Inventors: Richard Mrlik, San Francisco, CA (US); Eric Stafl, San Francisco, CA (US)

(73) Assignee: Intertie, Incorporated, Sausalito, CA (US)

( * ) Notice: Subject to any disclaimer, the term of this patent is extended or adjusted under 35 U.S.C. 154(b) by 81 days.

(21) Appl. No.: 16/201,942

(22) Filed: Nov. 27, 2018

(65) Prior Publication Data

US 2019/0168630 A1 Jun. 6, 2019

Related U.S. Application Data

(60) Provisional application No. 62/593,409, filed on Dec. 1, 2017.

(51) Int. Cl.
| | |
|---|---|
| *B60L 53/60* | (2019.01) |
| *B60L 53/30* | (2019.01) |
| *H02J 7/00* | (2006.01) |
| *B60L 53/10* | (2019.01) |
| *H02J 7/02* | (2016.01) |

(Continued)

(52) U.S. Cl.
CPC ............... *B60L 53/60* (2019.02); *B60L 53/11* (2019.02); *B60L 53/30* (2019.02); *B60L 53/51* (2019.02); *B60L 53/53* (2019.02); *H02J 3/32* (2013.01); *H02J 3/385* (2013.01); *H02J 7/0027* (2013.01); *H02J 7/022* (2013.01); *H02J 7/35* (2013.01); *B60L 2210/10* (2013.01);

(Continued)

(58) Field of Classification Search
CPC .......... B60L 53/60; B60L 53/51; B60L 53/53; B60L 53/30; B60L 53/32; B60L 53/11; H02J 3/385; H02J 7/0027; H02J 7/022; H02J 7/35
USPC ................................................. 307/44, 64–65
See application file for complete search history.

(56) References Cited

U.S. PATENT DOCUMENTS

| 6,617,973 B1 * | 9/2003 | Osterman ............... E21F 17/06 320/137 |
| 9,205,756 B2 * | 12/2015 | Ito ........................... B60L 58/12 |

(Continued)

FOREIGN PATENT DOCUMENTS

WO 2015/103164 A1 7/2015

OTHER PUBLICATIONS

Patent Cooperation Treaty International Searching Authority, "International Search Report and Written Opinion of the International Searching Authority", re application PCT/US2018/063039 of Intertie, Incorporated dated Mar. 14, 2019; 14 pages.

*Primary Examiner* — Michael R. Fin
(74) *Attorney, Agent, or Firm* — Pillsbury Winthrop Shaw Pittman LLP

(57) ABSTRACT

A modular, integrated charging system and method for fast charging of a battery of an electric vehicle (EV) include an under-ground stationary battery storage system and an above-ground charging station, which is operatively connected to an AC grid and a solar panel. The EV's battery may be charged using little or no grid capacity by prioritiz- (Continued)

ing and managing power production and use based on loading and pricing in real time.

21 Claims, 10 Drawing Sheets

(51) Int. Cl.
*H02J 3/32* (2006.01)
*B60L 53/51* (2019.01)
*B60L 53/53* (2019.01)
*H02J 3/38* (2006.01)
*H02J 7/35* (2006.01)

(52) U.S. Cl.
CPC ....... *B60L 2210/30* (2013.01); *B60Y 2200/91* (2013.01); *B60Y 2300/91* (2013.01); *H02J 7/0045* (2013.01)

(56) References Cited

U.S. PATENT DOCUMENTS

| | | | |
|---|---|---|---|
| 10,355,611 B2* | 7/2019 | Nagashima | B60L 53/53 |
| 2008/0217998 A1* | 9/2008 | Parmley | H02J 7/35 307/65 |
| 2009/0029110 A1* | 1/2009 | Montiel | B29C 70/687 428/158 |
| 2010/0181957 A1 | 7/2010 | Goeltner | |
| 2010/0306027 A1* | 12/2010 | Haugh | G06Q 10/04 705/7.36 |
| 2011/0133684 A1* | 6/2011 | Eikeland | B60L 53/11 320/101 |
| 2011/0204720 A1* | 8/2011 | Ruiz | H02J 3/14 307/66 |
| 2012/0074901 A1* | 3/2012 | Mohammed | H02J 7/045 320/109 |
| 2012/0259723 A1* | 10/2012 | Ansari | H02J 7/0027 705/26.3 |
| 2016/0176305 A1 | 6/2016 | James et al. | |
| 2020/0062138 A1* | 2/2020 | Smolenaers | B60L 53/62 |

* cited by examiner

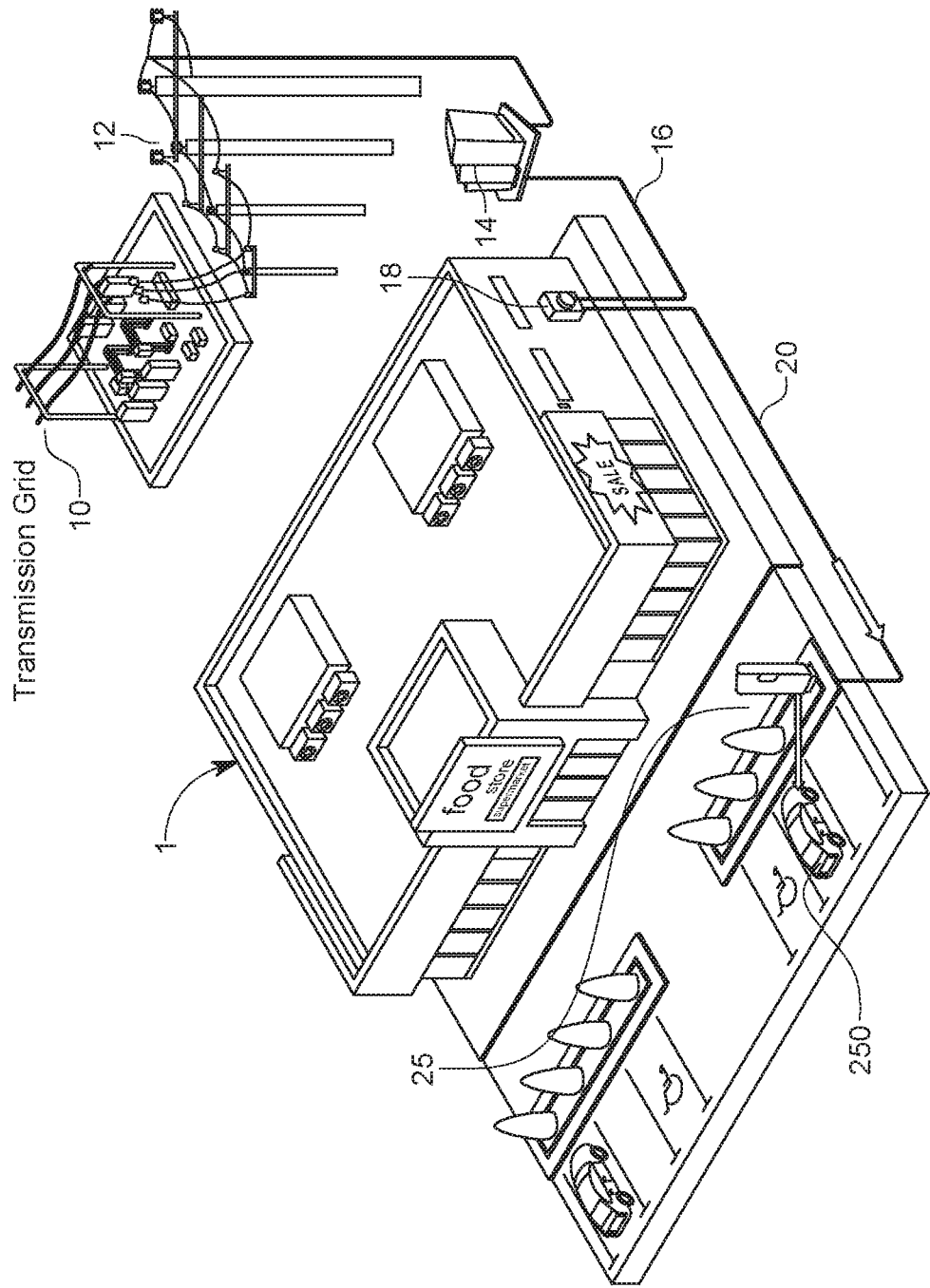
FIG. 3A: Illustration of Lower Speed Charger Installation

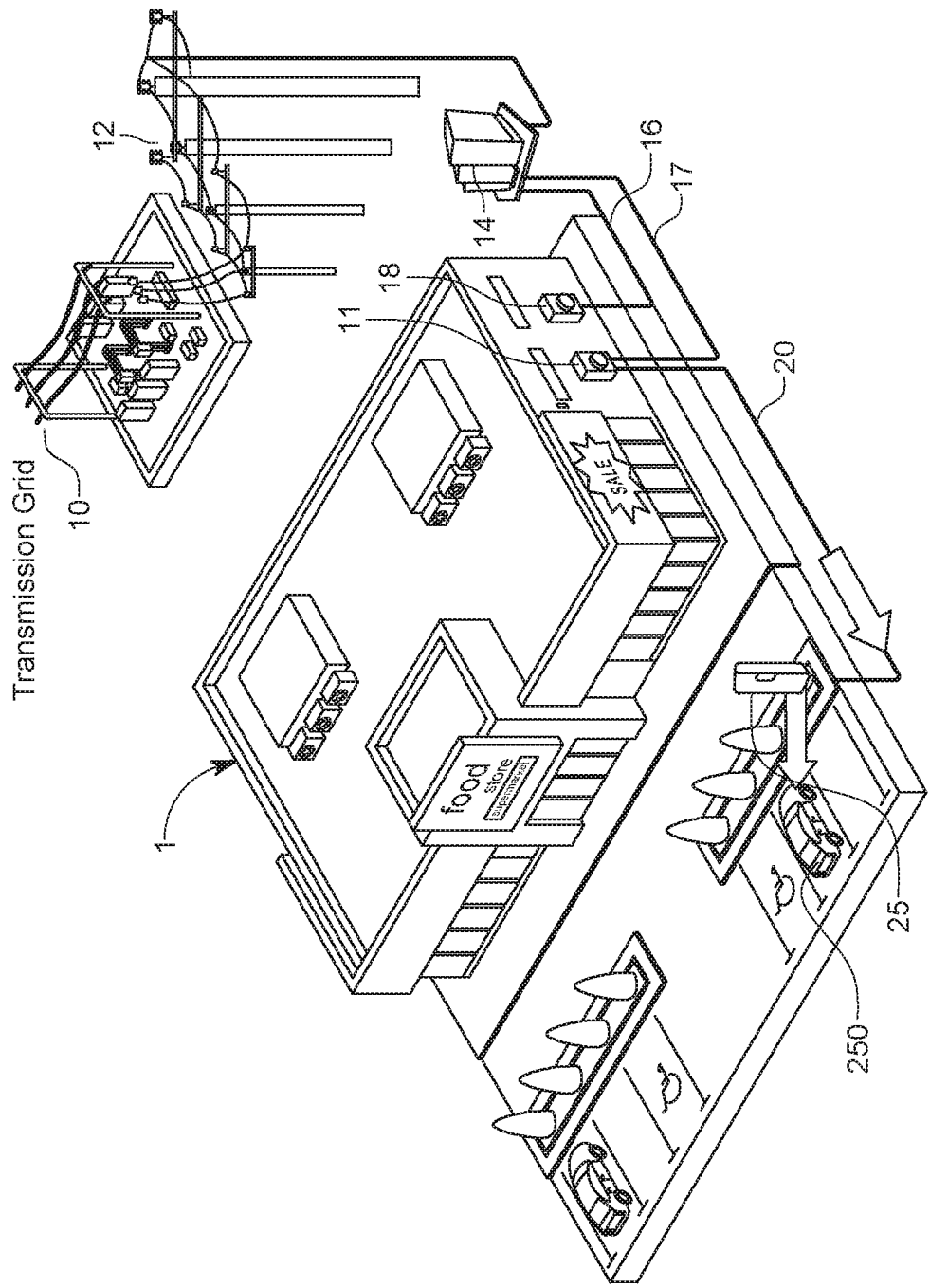
FIG. 3B: Illustration of Typical Fast Charger Installation - New Service Required

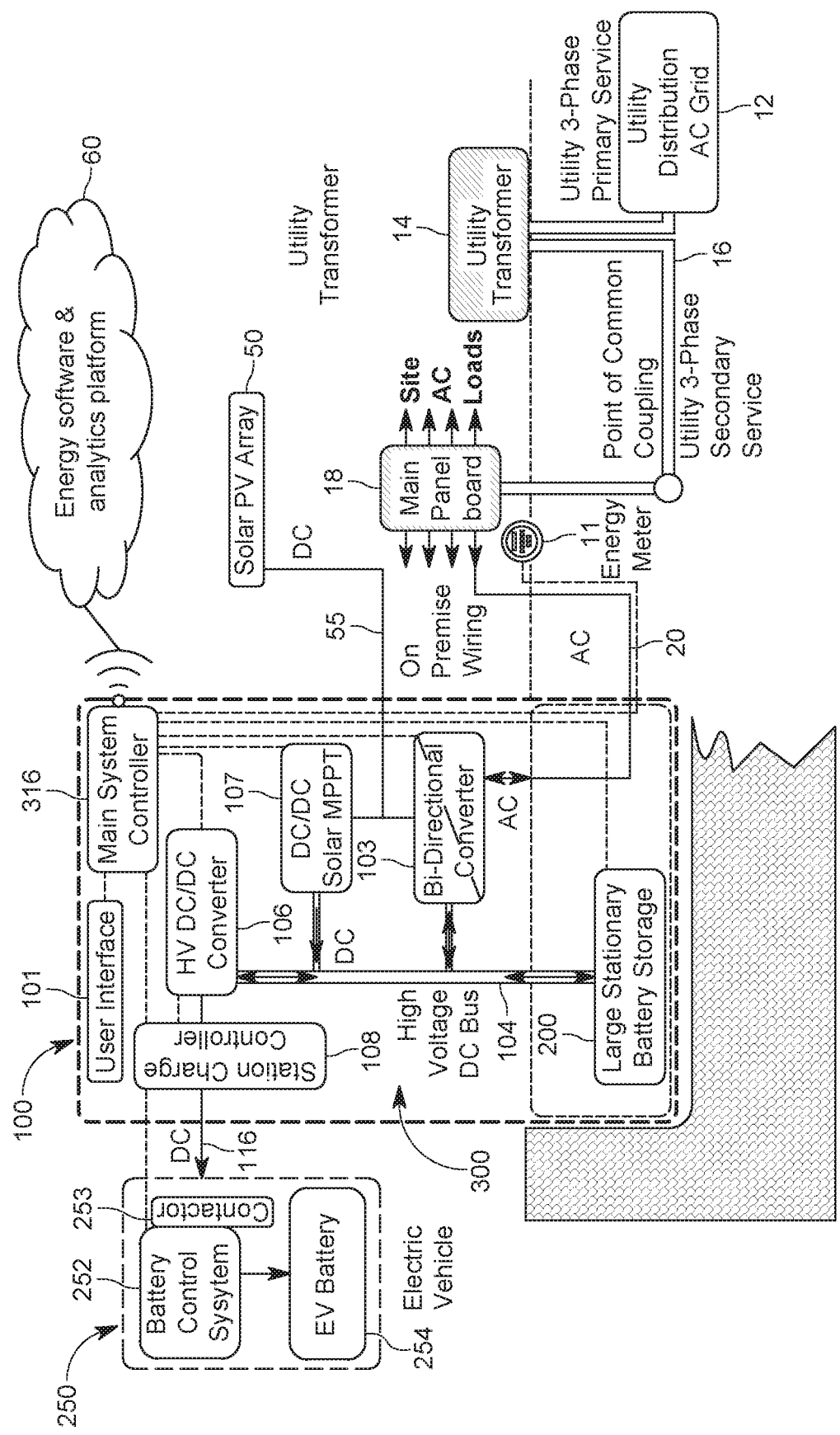
FIG. 5: Block Diagram of System Hardware and Premise Electric Distribution

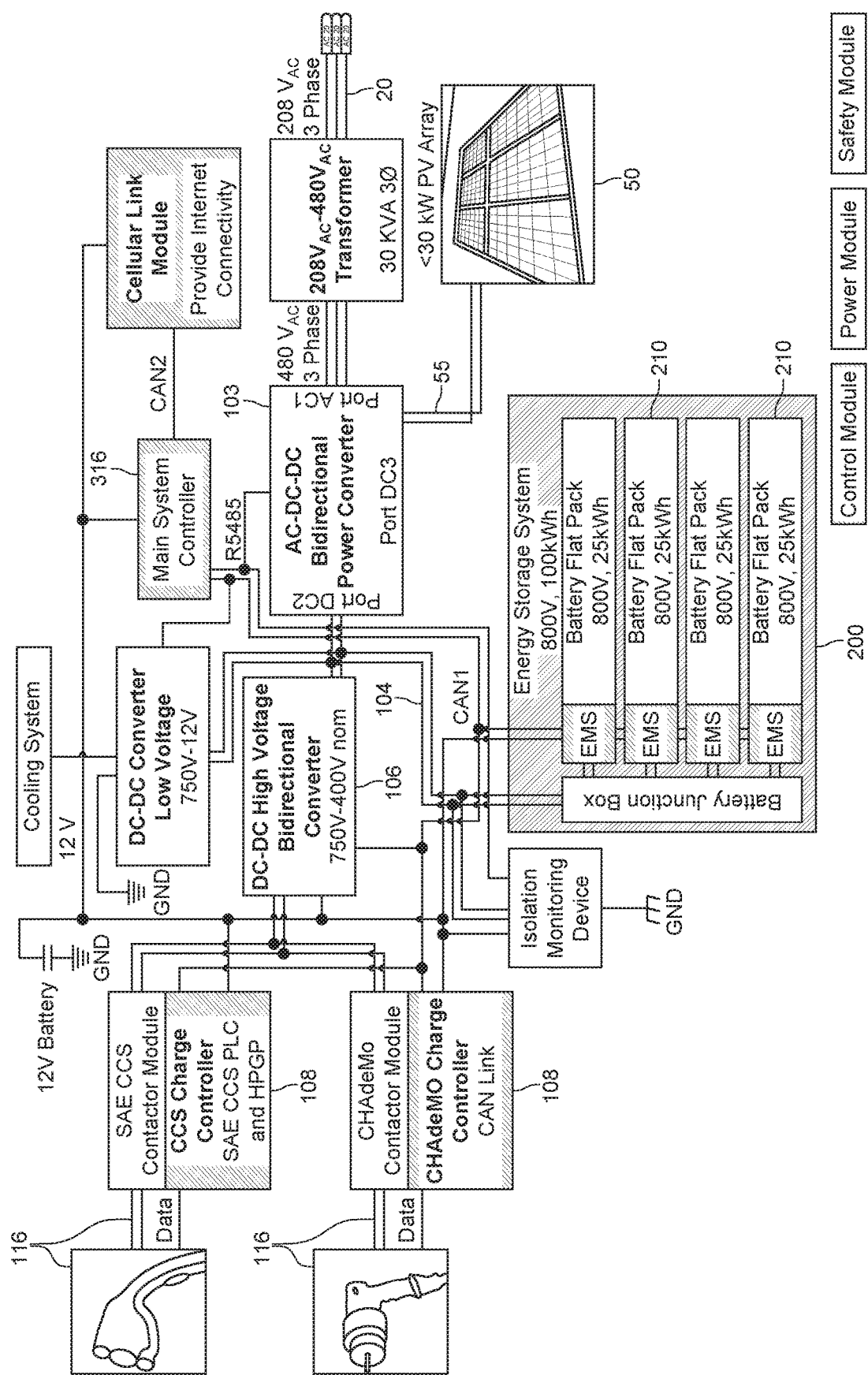
FIG. 6: Detailed Block Diagram

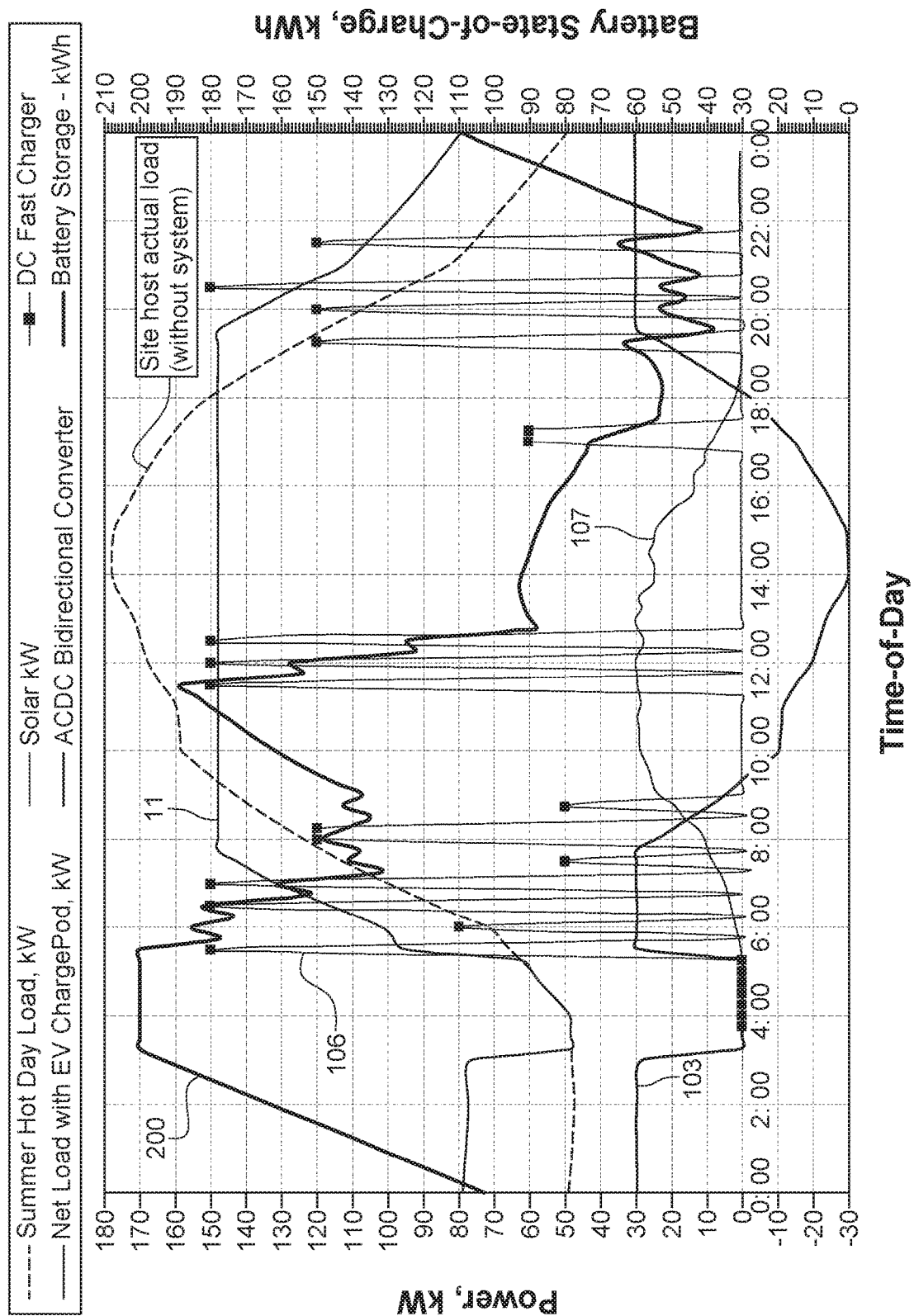
FIG. 7: Simulated Daily Operation of Installed System

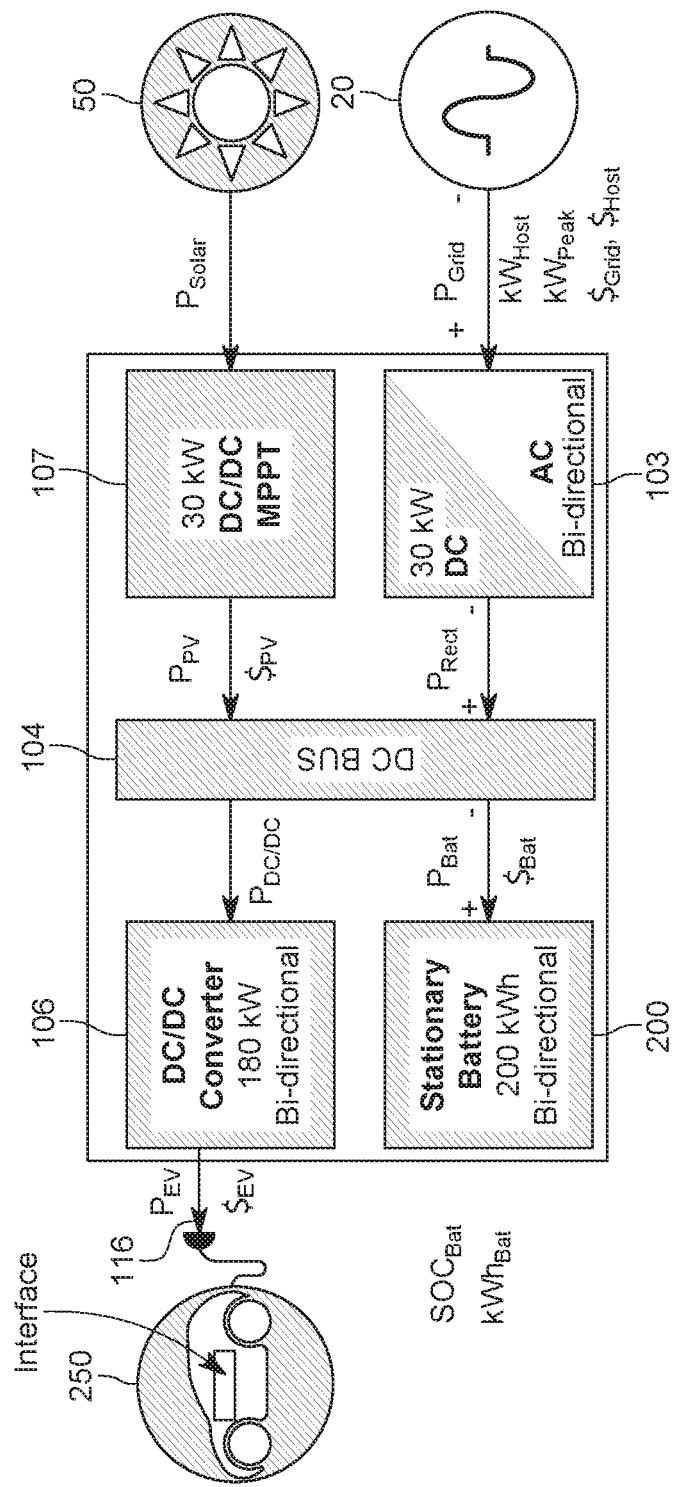
FIG. 8: Controller Power Flow Base Diagram

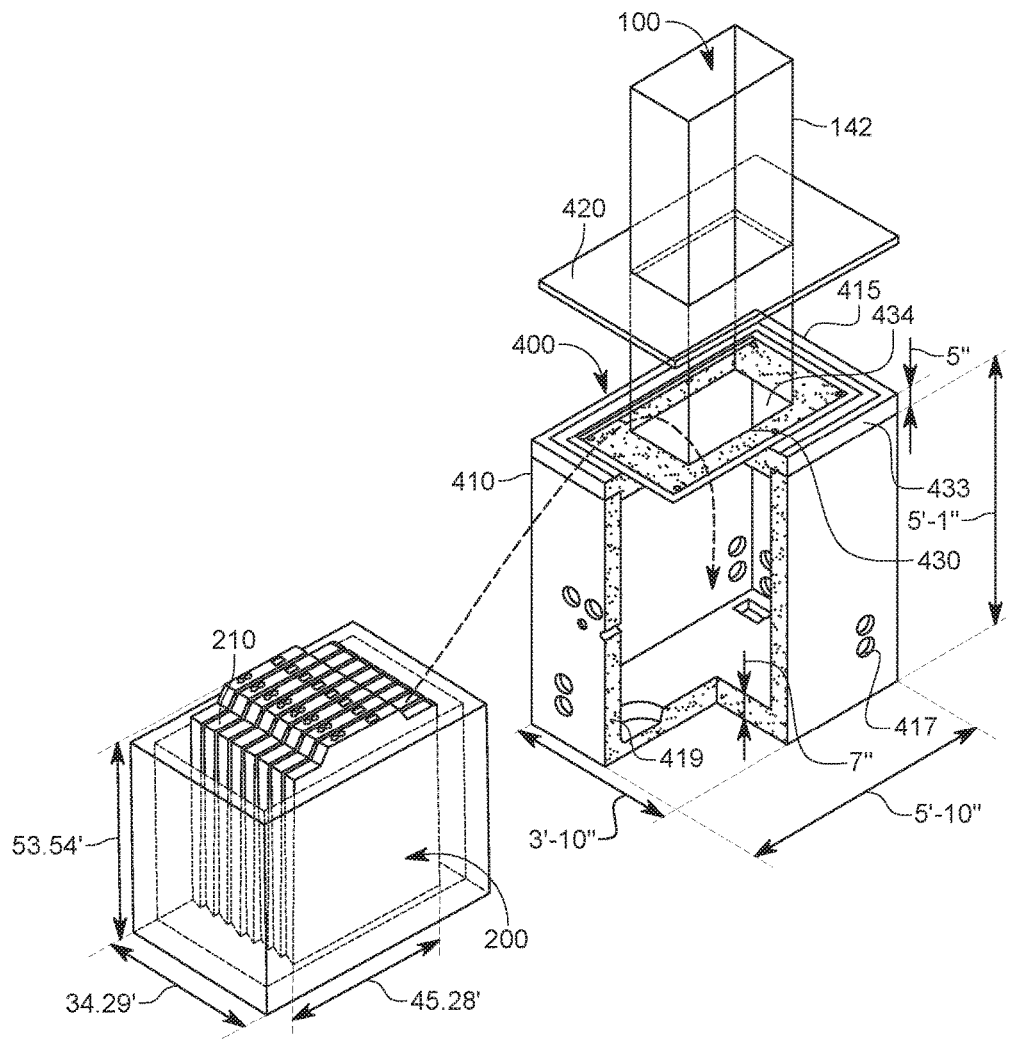
FIG. 9: Vault & Cover Design enabling Retrievable battery packs

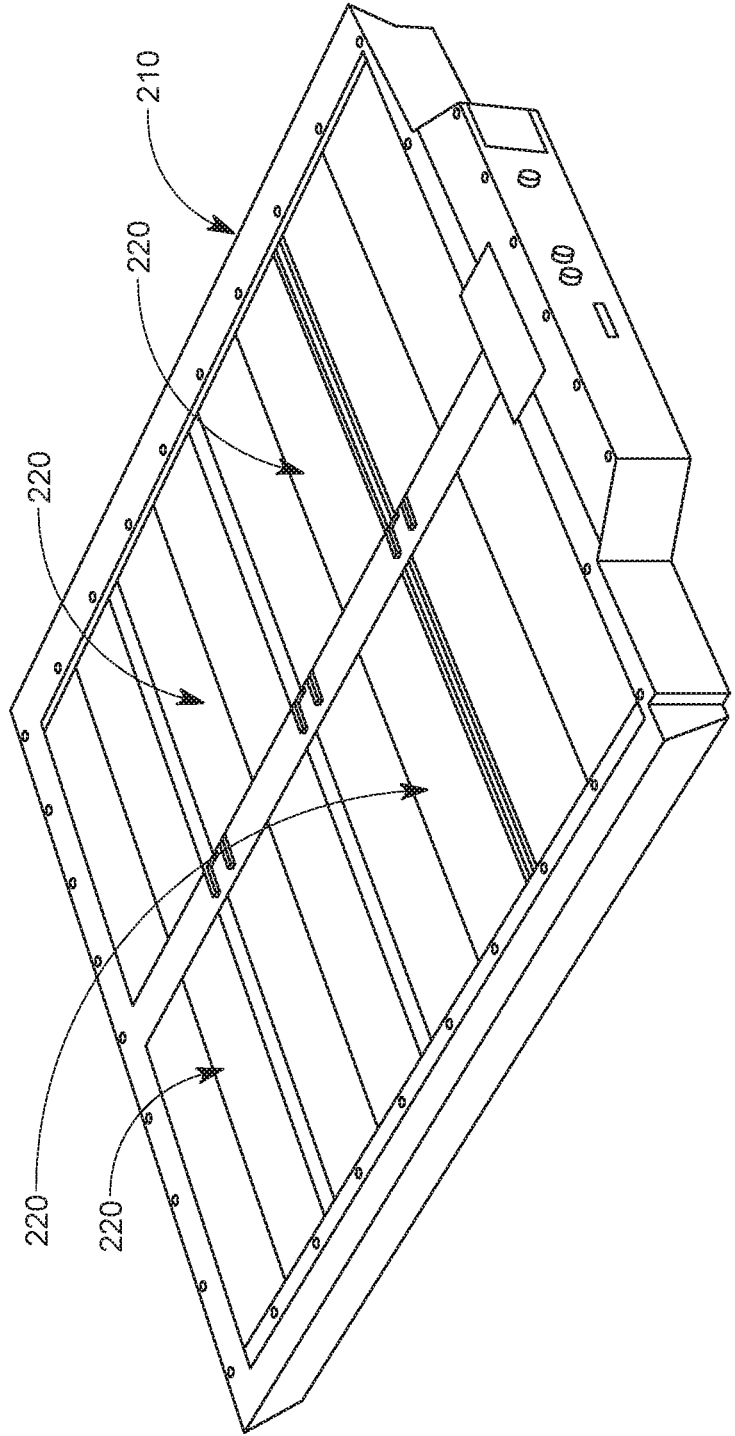
FIG. 10: Completed Battery Flat Pack and BMS Design & Architecture

DEVICES, SYSTEMS, AND RELATED METHODS FOR POWER CONVERSION AND MANAGEMENT

RELATED APPLICATION DATA

This application claims the benefit of U.S. Provisional Application Ser. No. 62/593,409, filed Dec. 1, 2017, which is incorporated herein by reference in its entirety.

FIELD OF INVENTION

Embodiments herein are related generally to methods, systems, and devices for power conversion and management and, in particular embodiments, to modular, integrated systems and devices, and methods for manufacturing, operationalizing, and using same.

BACKGROUND

Increasing renewable power and reducing transportation emissions are imperatives for meeting climate and clean air goals. The state of California, for instance, has prescribed targets for renewable power and the zero-emission vehicles on its roads to achieve its climate change goals. As a result of prior mandates, roughly 28% of retail electricity is supplied by renewable sources and are already impacting grid operations, prompting the California Independent System Operator (CAISO) to increase the level of energy storage for the grid to maintain reliability. California's target for renewable energy by the year 2030 has been set at 50%. However, achieving this goal will pose major operational challenges to grid reliability.

Similarly, California has set ambitious goals for transportation emissions, which constitute the largest source of its Greenhouse Gases (GHGs). To achieve mandated 40% GHG emissions reduction by 2030, the State's goal is to have 1.5 million zero-emission vehicles (ZEVs) on the road by 2025, and 15 million in the 2030s. In this regard, Electric Vehicles (EVs) are the dominant choice, and the industry believes that widespread acceptance will require 1 public charger per 10 EVs. Powering the State's EV target will require a considerably larger grid based on current charging technology. Hence, climate change imperatives and grid realities are on a collision-course, as the grid is ill-equipped to simultaneously accommodate power flow from intermittent renewable generation and the large incidence of power bursts from charging a sizable population of EVs.

The renewable influx is already causing grid problems including, for example, oversupply; short, steep ramps to meet demand; and decreased frequency response. The CAISO's forecast of future Net Load curves, referred to as "the Duck Curve" and illustrated in FIG. 1, shows these conditions. As more solar- and wind-produced energy is added to the grid, Net Load sags around mid-day, when solar generation is at its highest level (indicated by the "duck's belly"), thereby causing over-generation of power because inflexible resources, such as nuclear energy generation, cannot be curtailed. The CAISO's Net Load in the early evening, on the other hand, rises rapidly as solar power generation falls when the sun goes down (indicated by the "duck's head"), therefore requiring a very steep ramp-up of energy generation. To reliably operate as the grid becomes greener, operators (e.g., the CAISO) will increasingly need flexible resources, such as storage, to offset these conditions. For example, much higher levels of storage will be required to achieve California's 50% renewable target.

A significant weakness of current charging technology is that, when charging, the full capacity of the grid, from generator to EV, must be connected and energized simultaneously, as illustrated in FIG. 2. There must be enough capacity in the transmission, distribution, and service circuits to supply short-duration electric surges caused by (EV) charging. Given that the faster the required charge, the larger the surge will be, electric utilities build their electric system(s) to accommodate the maximum power surge, or peak instantaneous demand, of customers. As such, commercial electric rates are designed such that customers pay for the peak instantaneous demand they may cause, in addition to the electric energy that they actually use. Under this scheme, therefore, electric loads with short-duration peaks, such as that caused by EV charging using conventional electric vehicle supply equipment (EVSE), have very high electric demand charges, which result in very high electric rates.

Automakers generally agree that super-fast charging is the critical next step in the evolution of EVs, and a convenient super-charging network is needed to accelerate mass market adoption. While most charging may occur at home and work, EV drivers also need a convenient, dependable super-fast charging network. Fast charging generally requires power levels of 150 kW or greater which, by comparison, requires the same grid capacity as more than thirty homes. The grid, therefore, will need to be significantly larger to support the widespread fast charging network. In practice, grid expansions are costly and time consuming, and may face general public opposition, generically referred to as NIMBY ("Not In My Back Yard"). The low utilization of electric infrastructure also makes charging with current technology particularly expensive. Hence, the main impediment to meaningfully increased EV penetration is the grid's inability to serve the power demands of super-fast charging.

FIG. 3A illustrates a simplified view of a typical EV charger installation, including a basic electricity transporting grid to which a charging unit 25 may connect. As shown in FIG. 3A, a transmission circuit and substation 10 provides generated energy to a utility distribution circuit 12. A utility distribution transformer 14 steps down the distributed voltage for in-premise use at a customer's premises, shown generally as reference numeral 1. Once stepped down, electricity is carried to the customer's service entrance equipment and customer's electric distribution panel board 18 by an electric circuit providing utility service 16. A branch circuit 20 from the panel board 18 then connects to a charging unit 25.

It is generally known that super-fast charging of electric vehicles using conventional electric vehicle supply equipment (EVSE) causes particularly large loads, which also increases the risk of overloading the electricity transporting grid. As such, the branch circuit 20 and the customer's electric panel board 18 to which the branch circuit is connected in a typical commercial service cannot accommodate the high-power requirement of super-fast charging using conventional EVSE. The size of utility service 16 (in FIG. 3A) would need to be increased, and/or one or more additional utility service(s) 17 with another electrical panel board 11 (as shown in FIG. 3B) would need to be installed in order to accommodate super-fast charging using current EVSE, which could also cause overloading of the utility distribution transformer 14. Accordingly, the load demands of a plurality of super-fast chargers to accommodate the emerging EV market are expected to have a cumulative impact on utility distribution circuits 12, and potentially the substation 10, as the increased load requirements would propagate up through the circuit. It is noted that, in the foregoing scenario, even if the grid is not overloaded, the particularly large load caused by super-fast charging of electric vehicles using conventional EVSE would disadvantageously result in high electric demand charges.

The art has attempted to deal with the increasing loads caused by fast-charging using conventional EVSE by replacing and/or upgrading of electric facilities to meet new and expected demand. In such a case, the customer's electric panel board 18 would need to be replaced and upgraded, but even so, would likely be unable to accommodate the 150 kW power requirement for super-fast charging. To accommodate super-fast charging, the size of utility service 16 would need to be increased, and/or one or more additional utility service (s) 17 extended, and the distribution transformer 14 would need to be replaced and upgraded. Here the EVSE would generally need to be located near the distribution transformer 14, which may not necessarily be in a convenient location. The distribution circuits 12 and substation 10 may also need to be upgraded. However, mass replacements of such installments are expensive and could be prohibitively so in the case of expected strain caused by EVs.

The art has also attempted to mitigate the loads that are caused by charging EVs by utilizing methods and/or systems that control the rate and timing of charging of individual EVs to limit the aggregate load impact caused by multiple EVs simultaneously plugged in to EVSEs. Such methods involve scheduling the charging of EVs both spatially and temporally, with EVSEs and electric meters communicating with a load management system, to control EV charging so that the aggregate demand of the EVs does not cause electric loads to exceed the rated capacity or load threshold of utility services 16, distribution transformers 14, distribution circuits 12 and/or substations 10. While this method can be used to prevent electrical overloads on the grid caused by the aggregate charging demand of multiple EVs, each EV cannot control its charging rate and must follow a schedule provided by the load management system. This solution is suitable for EVs expecting to be plugged into EVSEs for a considerable time period, however, this solution is not suitable for drivers needing to fast-charge their EVs, due to limited time to charge.

SUMMARY

According to an embodiment of the inventions herein, a modular, integrated charging system for fast charging of a battery of an electric vehicle (EV) comprises an underground stationary battery storage system; an above-ground charging station, said charging station being disposed substantially directly above said battery storage system, and including: a user interface; a bi-directional alternating current/direct current (AC/DC) power converter that is configured to receive and rectify AC power from an AC power grid into DC power; a high voltage (HV) direct current/direct current (DC/DC) converter; a high voltage (HV) DC bus that is configured to receive DC power from said bi-directional AC/DC power converter and from a solar photovoltaic (PV) array and to operatively connect said battery storage system and said HV DC/DC converter; a station charge controller that is off board said electric vehicle and regulates transfer of DC power between said HV DC/DC converter and said EV battery; and a charging system master controller that is configured to optimize and manage power flow among said AC power grid, said solar PV array, said battery storage system, and said EV battery.

In accordance with another embodiment, a method for fast charging of an electric vehicle (EV) through an integrated charging system including an above-ground charging station, an under-ground stationary battery system, and a system controller, the charging system being in operational contact with an alternating current (AC) power grid and a solar array, comprises providing power to said stationary battery system by at least one of said AC power grid and said solar panel; converting said power to direct current (DC) charge and storing said DC charge by said stationary battery system; receiving a request, by said system controller, for charging a battery of said electric vehicle; determining in real time, by said system controller, whether power for charging said battery of the electric vehicle should be delivered from said AC grid, said solar array, said stationary battery system, or a combination thereof; identifying, by said system controller, one or more of said AC grid, said solar array, and said stationary battery system as a source for delivering power to said battery of the electric vehicle; and routing, by said system controller, power from the identified source to charge said battery of the electric vehicle based on said identification.

In yet another embodiment, a method of real-time power distribution and management among a plurality of power sources, the plurality of power sources including an alternating current (AC) grid and a solar photovoltaic (PV) array, comprises operatively connecting said AC grid and solar PV array to a battery storage system; storing power from said AC grid in said battery storage system during one or more off-peak time windows; storing power from said solar PV array in said battery storage system during daylight hours; and identifying one of said power sources, based on respective power loads on said plurality of power sources and real-time cost of providing power from each respective source, for providing fast-charging power to a battery of an electric vehicle without imposition of additional loading on said AC grid and said solar PV array.

BRIEF DESCRIPTION OF THE DRAWINGS

A detailed description of embodiments of the inventions herein will be made with reference to the accompanying drawings, wherein like numerals designate corresponding parts in the figures.

FIG. 3A illustrates existing interconnections and interactions among an electric vehicle, a grid, and a site.

FIG. 3B illustrates a fast-charger installation which requires the addition of a new electric service from the utility in order to accommodate fast charging.

FIG. 5 illustrates a block diagram of a charging system and related components, systems, and subsystems in accordance with embodiments of the invention.

FIG. 6 illustrates a block diagram of control, power, safety, and related components, systems, and subsystems in accordance with embodiments of the invention.

FIG. 7 shows a graph of the simulated daily operation of a system in accordance with embodiments of the invention.

FIG. 8 is a system controller base diagram according to embodiments of the invention.

FIG. 9 is an exploded view of an under-ground vault assembly according to an embodiment of the invention.

FIG. 10 is a perspective view of a battery pack module according to an embodiment of the invention.

DETAILED DESCRIPTION

Figure 1:
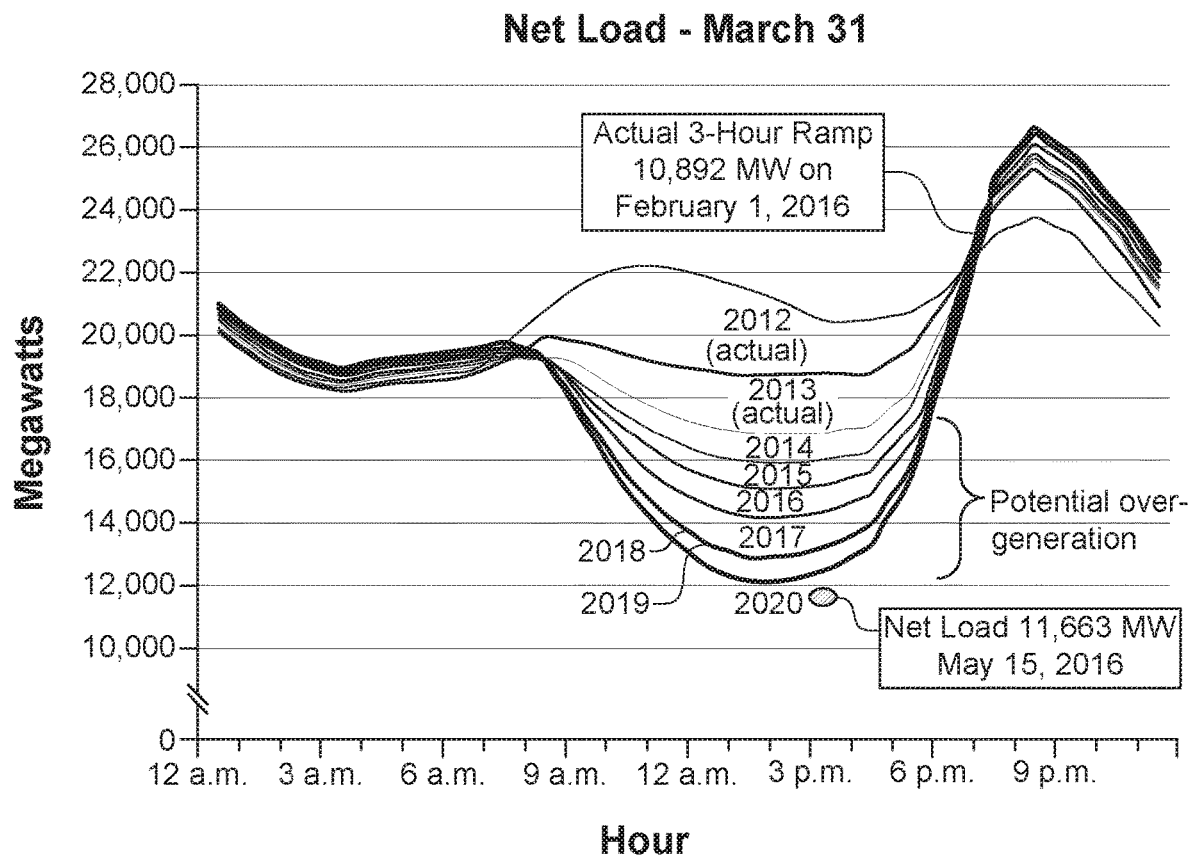
FIG. 1 is an illustration of a net load curve.
Figure 2:
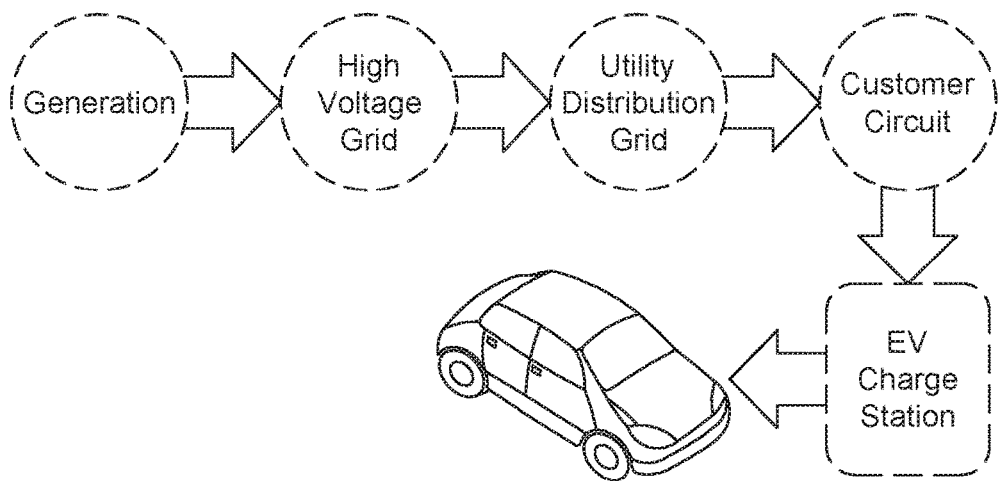
FIG. 2 shows the current state of the art in electric vehicle charging.

In the following description, reference is made to the accompanying drawings which form a part hereof and which illustrate several embodiments of the present inventions. It is understood that other embodiments may be utilized and structural and operational changes may be made without departing from the scope of the present inventions.

The inventions herein may be described below with reference to flowchart illustrations of methods, systems, devices, apparatus, and programming and computer program products. It will be understood that each block of the flowchart illustrations, and combinations of blocks in the flowchart illustrations, can be implemented by programing instructions, including computer program instructions (as can any menu screens described in the figures). These computer program instructions may be loaded onto a computer or other programmable data processing apparatus (such as a physical controller, microcontroller, or processor in a sensor electronics device) to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, and/or menus presented herein.

Embodiments of the inventions herein are directed to an improved charging station and charging system that reduces grid impact caused by high power requirements of charging EVs. Thus, in one embodiment, the inventive devices, systems, and methods herein enable charging of an EV using little or no grid capacity by taking a fundamentally different approach to charging vis-à-vis the existing state of the art. Specifically, in embodiments, the inventions described herein draw energy at a low power level when the grid has capacity, and intelligently fill a large, stationary battery (storage system) in real time to energy levels that enable charging of EVs at high speeds, thereby providing EV drivers the ability to fast-charge irrespective of the current electrical loading on the electric system, and without impacting the grid. In this regard, in one aspect, the inventions herein integrate solar power capabilities to reduce the impact of EV charging on the grid. At the same time, the inventions herein provide for bi-directional utility by simultaneously allowing power to be supplied to the site host, thereby providing valuable services to the grid. Thus, embodiments of the inventions herein provide multi-functional, bi-directional, real-time algorithms, devices, and systems that are designed to meet growing electric transportation needs, while, at the same time, addressing future local and grid requirements.

As will be described in more detail hereinbelow, particular embodiments of the inventions are directed to a modular, intelligent charging system that integrates a direct-current (DC) fast charger, battery storage, bi-directional alternating-current (AC) interface to the grid and photovoltaic (PV) source in one multi-functional, pre-fabricated, outdoor unit. In one aspect, the system functionally draws power from available grid capacity and solar-powered PV cells, stores energy in, and releases electricity from, a large in-ground (i.e., underground) battery storage system, and routes power flow to and/or from the grid, while allowing fast-charging of an electric vehicle (EV). The system provides DC fast charging of EVs with standard connectors without placing a large load on the grid, connects to solar photovoltaic panels and supplies electric services to a site and grid. High power DC fast charging may be provided to an EV using a low power grid connection by boosting power from a large, in-ground vault installed battery system. As will be described in further detail hereinbelow, the battery may be a lithium-ion battery, and may also be used for customer energy management and grid services.

In embodiments of the invention, the in-ground vault may be designed to be the base of the aboveground charging unit, as well as provide grounding and allow future replacement of individual battery packs that constitute the battery (or battery storage system). The system architecture may be both modular and scalable. Thus, the stationary in-ground battery may connect to a high-voltage DC nanogrid that connects replaceable components, including: a high-power DC/DC converter to supply DC fast-charging; a grid-tied bi-directional power converter; and a solar maximum power point tracker (MPPT)-DC/DC converter. In alternative embodiments, use, and/or connection to, the latter MPPT-DC/DC converter may be optional. In yet further alternative embodiments, the system may operate by integrating, through a controller (such as, e.g., described hereinbelow), the output of a solar array that is configured to supply an external solar inverter on an AC side of the grid.

In embodiments of the inventions, a controller system may be coupled directly to all power electronic components to control power flow from the grid and solar source to serve the highest value load, in the most efficient, cost-effective manner. Load value determination, cost effectiveness, efficiency, and/or additional prioritization decisions may be made in accordance with information obtained from, e.g., cloud-based analytics, machine learning (used, e.g., in forecasting or estimating future values of the aforementioned factors), and optimization software, which may be embedded in the inventive system and/or used in operational cooperation therewith.

In a preferred embodiment, the modular, prefabricated system provides an integrated unit that can be safely installed in parking and sidewalk areas. Advantageously, because the system is configured to easily interconnect to the local electric grid (including relatively low-power panels, such as, e.g., behind-the-meter circuits connecting to customer panel boards), it can be located at most desired locations. Thus, the prefabricated, modular system provides for a multifunctional nanogrid housed in a contiguous enclosure by connecting the preassembled above-ground enclosure (the charging station) to the battery system housed in the under-ground vault assembly (the stationary battery storage system). In preferred embodiments, the preassembled aboveground enclosure may contain a high-power DC/DC converter for DC-fast charging, a solar DC/DC MPPT converter, and a grid-tied bi-directional AC/DC power converter, all of which may be connected to a high-voltage DC bus housed within a power distribution junction box, which, during installation, connects to a single receptacle in the battery pack junction box that is connected to multiple battery packs that constitute the stationary battery storage system.

In practice, embodiments of the invention provide a level of multi-functionality, which allows the high cost of power electronics and battery systems to be spread over several functions and increases their value through added revenue streams. As is known, large battery packs are quite expensive. Embodiments of the present invention spread this cost over several functions, including boosting power for charging integrating solar power, for load management such as peak shaving, energy arbitrage (buy low-sell high vis-à-vis energy demand), back-up power when grid power outages occur, and to generate grid services (including, e.g., demand response and voltage support). By stacking EV charging and storage generated revenues, the battery payback is shortened. Similarly, PV systems have relatively expensive grid-tied inverters whose sole purpose is to convert DC power from the PV panels to AC power. Embodiments of the inventions herein use this grid-tied inverter to also convert DC power from the stationary battery storage system and/or solar PV system and DC power from the EV battery to AC to perform useful ancillary services to the grid and/or provide power to the site.

Figure 4:
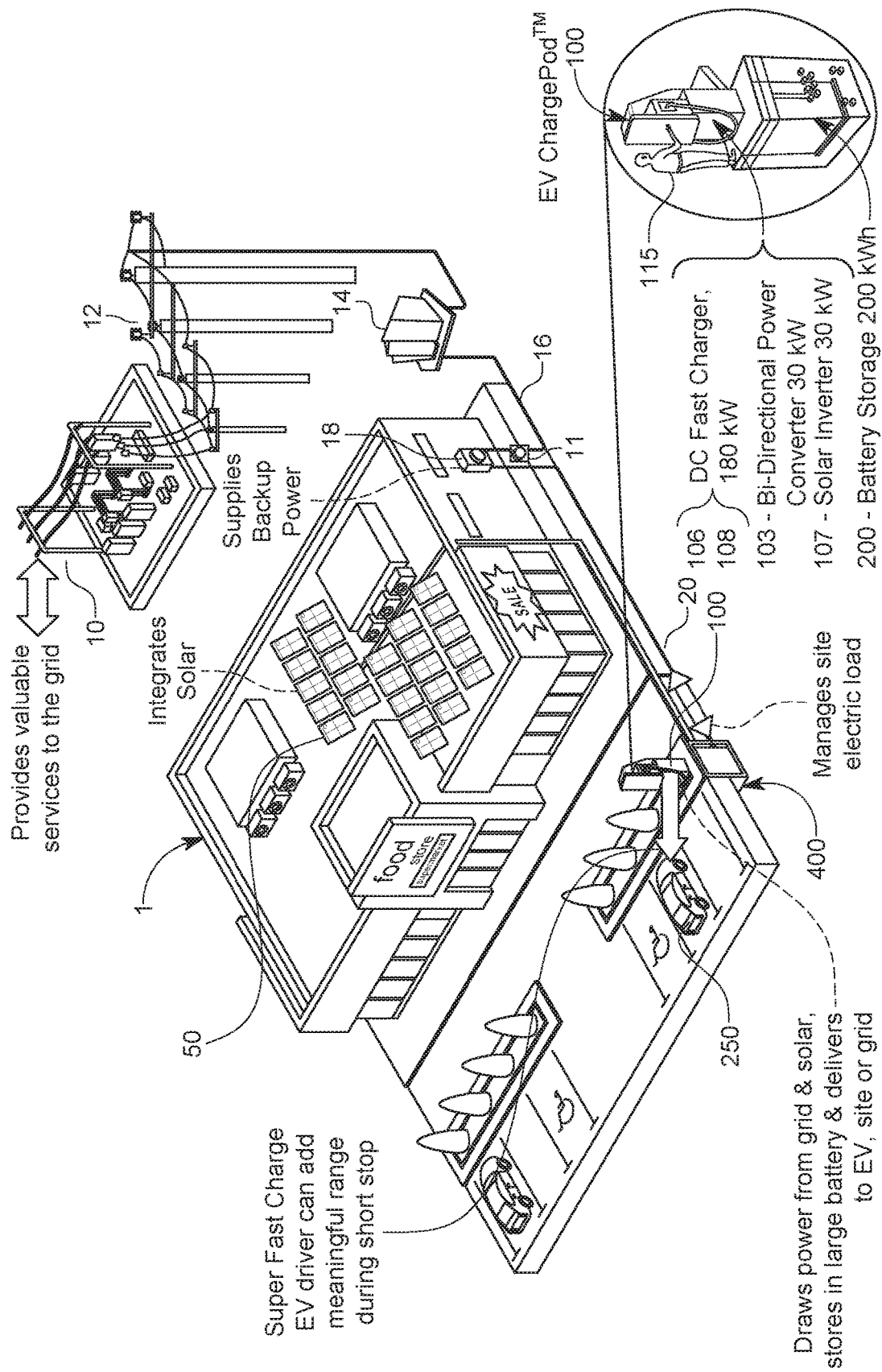
FIG. 4 illustrates the interconnections and interactions among an electric vehicle, a grid, and a site in accordance with embodiments of the invention.

With the above in mind, FIG. 4 provides an illustration of the interconnection between embodiments of the invention and a typical, or standard, grid system, and FIGS. 5 and 6 show details of the interconnection, systems, and subsystems in accordance with embodiments of the invention. Specifically, in a preferred embodiment, a charging station (or charger) 100 connects to the branch circuit 20 from the panel board 18, as well as a stationary, under-ground battery storage system 200 housed within a vault system 400. Together, the charging station 100 and the battery storage system may be referred to as an integrated charging system 300.

A shown in the block diagram of FIG. 5, the charging station 100 may be connected to an AC circuit 20 using permanent AC wiring from a main switchboard (panel board) 18, e.g., of a commercial building, and operatively connected to a solar PV array 50, and battery storage system 200. The charging station intelligently combines these power sources and connects to an electric vehicle 250 to charge the vehicle's battery (EV battery) 254 via the high voltage (HV) DC/DC converter 106 and station charge controller 108. Because the station charge controller 108 is off board the EV 250, it must communicate with the EV's battery control system 252, which controls the charging of the EV's battery 250 by the charging station 100. In practice, an individual 115 may use the user interface 101 of the charging station 100 to purchase electricity, which is then delivered as DC power (e.g., via connection 116) to the EV's battery 254 through a DC contactor 253 and under the control of the EV's battery control system 252.

In preferred embodiments, AC power may be transferred to and from the charging system 300 via a bi-directional power converter 103 that both rectifies AC power into DC power, and inverts DC power into AC power. The power converter 103 steps up voltage and bi-directionally transfers DC power to a high voltage DC bus 104 that, in turn, connects to the stationary battery storage system 200, a high-power DC/DC converter 106, and a MPPT DC/DC converter 107. In one embodiment, the system 300 is connected to the solar PV array 50 using permanent DC wiring 55 that connects to the bi-directional converter 103 and/or the MPPT DC/DC converter 107.

The high-power DC/DC converter 106 provides the high power level required for DC fast-charging and is supplied via the DC Bus 104 from the stationary battery storage system 200, the bi-directional converter 103, and (optionally) the MPPT DC/DC converter 107. In embodiments of the invention, the bi-directional power converter 103 may have additional ports to also transfer DC power from the solar array 50 (see FIG. 6), as well as perform maximum power point tracking (MPPT) and voltage conditioning functions to optimize solar PV output. Thus, in an embodiment shown in FIG. 6, the bi-directional converter 103 transfers energy via a single AC port (e.g., "Port AC1" shown in box "103" in FIG. 6), and dual DC power ports, wherein one of the DC ports may be used to transfer power to the DC bus 104 (e.g., "Port DC2" shown in box "103" in FIG. 6), and a second DC port may be used to integrate solar power (e.g., "Port DC3" shown in box "103" in FIG. 6). By comparison, the embodiment shown in FIG. 5, e.g., shows a bi-directional power converter 103 with a single AC and a single DC port, wherein the latter may be used to transfer power to the DC bus 104, and wherein solar power may be integrated using a separate MPPT DC/DC converter 107. Alternatively, solar power may be integrated without the MPPT DC/DC converter, whereby a solar array may be operationally connected to an external (grid-tied) solar inverter, which may be located, e.g., outside of the aboveground charging station 100, and behind the onsite meter. In this configuration, the external solar inverter may invert solar DC to AC output, which, in turn, may be integrated at the AC side of the bi-directional power converter 103 (and, therefore, of the aboveground charging station 100). In either case, however, embodiments of the inventions herein advantageously enable concurrent input from, and use of, both solar power and energy from the grid to supply the DC bus 104.

The bidirectional DC-DC converter 106 may be used as a connection between the high-voltage DC bus 104, and lower-voltage electric vehicle battery 254. In a preferred embodiment, the high-voltage DC bus 104 operates at the voltage of the stationary battery storage system 200, and is approximately double the voltage of the electric vehicle battery 254. This design enables Buck converter topology, resulting in smaller and lower cost DC-DC converter 106 hardware and higher efficiency. The higher voltage DC bus 104 allows for smaller conductor sizing which, in turn, allows savings in both cost and weight. In an embodiment of the invention, the voltage level of the DC Bus 104 and the stationary battery system 200 may generally be between 600 and 800 VDC.

In accordance with an advantageous aspect of embodiments of the invention, the charging system 300 has a modular architecture so as to enable fast, efficient, and convenient replacement and/or upgrading of various of the power electronic components, or modules, including, e.g., the bi-directional converter 103, individual battery flat packs 210 within the stationary battery storage system 200 (four of which are shown in an illustrative embodiment in FIG. 6), the DC/DC converter 106, and (optionally) the MPPT DC/DC converter 107. Each of these modules includes embedded firmware, and is able to perform tasks independently and autonomously vis-à-vis the other components. As shown, the bi-directional converter 103, the DC/DC converter 106, and the MPPT DC/DC converter 107 connect, either operationally and/or physically, to the high-voltage DC bus 104 which, in turn, connects directly to the battery storage system 200. To enable structural minimization, which provides for one advantageous aspect of the present inventions, the DC bus 104 is of relatively short length.

Besides minimizing construction volume, the topology achieves extremely low operating losses. Locating the large stationary battery 200 and power electronic components 103, 106, and 107 in close proximity to the DC bus of relatively short length makes the system architecture quite forgiving, improves the reliability of power electronics operation, and increases the ability to use 'plug and play' components. In addition, the battery storage system 200 buffers power flows on the DC bus 104, thereby allowing the overall system 300 to mitigate transients, harmonics, electromagnetic interference, ripple voltages, ripple currents, etc. by inherently reducing them to acceptable levels at the input and output of each power electronics component, thus enabling more seamless integration in systems. For example, input and output power flows do not have to necessarily match perfectly, as the battery storage system 200 makes up short-term mismatches in power/current flow. Without the battery storage system 200 and power electronic components 103, 106, and 107 located in close proximity to each other, it is much more difficult to implement a reliable control system.

FIG. 7 is an illustrative example of the daily operation of a system in accordance with embodiments of the invention over a 24-hour period for a summer day. More specifically, the graph shows hourly power flow of system components that are optimally controlled for one particular use case to provide DC fast charging, integrate solar PV, reduce peak demand for this site host, and supply power to the grid. In this example, the bi-directional converter 103 begins to receive power from the grid at midnight at about 30 kW (shown on left ordinate of the graph in FIG. 7) and receives or delivers power from the grid throughout the day. A smart energy meter 11 (see FIGS. 4 and 5) is read continuously to determine the direction and power level of the bi-directional converter 103 to manage the site host's load.

As can be seen, in this example, there are three peak demand time periods for DC fast charging: between about 6 am and about 8 am, just before and after noon, and between about 7 pm and about 10 pm. Moreover, these peak periods are generally coincident with reductions in capacity of the battery storage system 200. In addition, as noted previously, the capacity of the battery storage system 200 undergoes further reduction in the afternoon and evening hours as solar energy generation 107 decreases (in this example, from a high of about 30 kW to about zero). As the evening progresses, and DC fast-charging demand decreases, the stationary battery 200 capacity increases from a low of about 40 kWh to about 110 kWh at about midnight (shown on right ordinate of the graph in FIG. 7).

The bi-directional converter 103 transfers power to and from the high-voltage power (DC) bus 104 that is connected to the in-ground battery storage system 200, the high-power DC-DC converter 106, and the solar MPPT converter 107. The battery storage system 200 transfers power to and from the high-voltage power bus 104. In addition, power may be continuously supplied throughout the day via the solar MPPT converter 107 to the high-voltage bus 104. The high-power DC-DC converter 106, in turn, supplies power from the high-voltage bus 104 in response to demand for DC fast charging (e.g., of EVs) throughout the day, and is able to supply power from the electric vehicle battery 254 to the high-voltage bus 104.

More specifically, in a preferred embodiment, the solar MPPT converter 107 is an electronic DC-to-DC converter that extracts the maximum possible power from the solar PV array (or module or panels) 50 by correcting for voltage mismatch between the solar module 50 and the stationary battery 200 which, in turn, controls the high-voltage DC bus 104. The solar MPPT converter 107 optimizes the energy generated by the solar array 50 and places the power on the high-voltage bus 104 where it is distributed to either the stationary battery 200 (for storage), to the high-power DC-DC converter 106 (for EV charging), or to the bi-directional converter 103 (to supply the site load or for grid services). Where power from the solar MPPT converter 107 is distributed to is controlled by the main system controller 316 (see, e.g., FIGS. 5 and 6) based on optimization algorithms provided from the energy analytics platform 60, which is described in further detail hereinbelow.

As described hereinabove, solar power may also be integrated via an external grid-tied inverter, whose AC output is integrated at the AC side of the bi-directional converter. Where power from the solar grid-tied inverter is supplied to the AC side of the bi-directional AC/DC converter 103, the power from the bi-directional AC/DC converter is controlled by the main system controller 316 (see, e.g., FIGS. 5 and 6) based on optimization algorithms provided from the energy analytics platform 60, which is described in further detail hereinbelow.

As noted previously, each of the primary components of the system 300 has embedded firmware and performs tasks independently and autonomously vis-à-vis other components. This maximally decoupled system allows greater flexibility and easier troubleshooting and simplifies system control. However, while the primary components do operate autonomously, they are nevertheless controlled at the system level by a master system controller 316 (see FIGS. 5 and 6). The master system controller 316 manages power flow by communicating with the power electronic components using standard protocols and control interfaces, and by communicating via the cloud with an energy analytics platform (i.e., a cloud-based software platform) 60. The energy analytics platform 60 has optimization algorithms that instruct the main system controller 316 on how to control power flow from sources (e.g., grid, battery, and solar) to serve the highest-value load (e.g., EV, host load, or grid) in real-time, and with optimized efficiency and cost-effectiveness.

The master system controller 316, supported by the cloud-based software platform 60, combines real-time monitoring, predictive analytics, and market and grid intelligence to price the value of EV charging, host load, and grid-services to instruct the system controller to control power flows—i.e., to enable the system 300 to deliver energy when it matters most. For example, the system can also provide backup power when the AC grid experiences power outages. For each site, the platform learns the energy profile of the host and the site's EV charging profile.

As illustrated in FIG. 8, the charging system 300, in conjunction with the platform 60, prices all uses and sources of power in real time, automatically routing power flow along the most efficient, and therefore, profitable, path. A determination is made, for instance, as to whether to charge an EV, peak shave, provide backup power, or supply grid services, subject to constraints such as solar availability and battery state of charge (SOC). In a preferred embodiment, power supplied to the fast charger (DC/DC converter 106) is prioritized by PV supply 50, 107, then the grid (when economically viable), and finally the stationary battery system 200. While the stationary battery system 200 is almost always used because it boosts EV charging speeds, it is called upon last to extend battery life.

To accommodate the battery storage system 200, embodiments of the invention include an integrated vault and removable cover assembly 400 (shown, e.g., in FIGS. 4 and 9) which is designed to not only house the battery storage system 200 underground, but also provide structural support for the aboveground charging station 100 while, at the same time, providing future access and containing a local earth electrode network within the vault that provides comprehensive grounding to protect against electrical shocks. This innovative design enables safe installation in public parking and sidewalk areas, including fire-prone areas, maximizing convenience for EV drivers and saving valuable real estate for property owners—advantageous features that are neither available nor practicable with existing systems and techniques.

In a preferred embodiment of the invention, the vault and cover assembly 400 includes a concrete vault structure 410 that is approved for high-voltage applications. The vault structure 410 may be dimensioned as follows: 3'×5'×4.5'. A cover assembly 415, which may be a standard (3'×5') cover assembly, is disposed atop the vault structure 410 and may be rated for incidental and/or full vehicular traffic based on local requirements. In one embodiment, the cover assembly 415 may be rated for, e.g., 16 Klb of traffic. The cover assembly 415 has a cover 420 that is designed to provide water-tight seal and aesthetic, slip-resistant flooring. In embodiments of the invention, other sizes, materials, and/or traffic load ratings may also be used for the cover and/or cover assembly, as dictated, e.g., by the location of the charging station 100. In preferred embodiments, the cover assembly is configured to provide a standard curb height in parking areas and be level with grade in sidewalk areas.

The charging station 100 is supported by a structural base 430 that is secured, e.g., bolted, to the cover assembly 415. In an embodiment of the invention, the structural frame 142 of the charging station 100 is bolted to the structural base 430 and can be later unbolted. The cover assembly 415 mounts inside the (e.g., 3'×5') external frame 433, which provides a form for cement or asphalt and is designed to allow the cover assembly to be removed and provide full access to the vault structure 410. The structural base is designed, e.g., through opening 434, to provide access for the high voltage DC bus 104 to and from the battery storage system 200, as well as AC power to and from the bi-directional converter 103. Similarly, the vertical walls of the vault structure 410 include conduit knockouts 417 to allow conduit attachment to convey AC cabling from grid and DC from a solar source. The vertical walls of the vault structure 410 may also include a local earth electrode network 419 that is formed by respective structural rebars. In a preferred embodiment, the cover assembly includes one or more bollards to protect the charging station 100.

As discussed previously, embodiments of the present invention provide for super-fast charging (or high-power output) while minimally impacting the electric grid (low-power input) by strategically installing a battery storage system 200 within the vault 400 at the point-of-sale. This allows the charging system 300 to boost charging power to the high levels that are necessitated for fast charging, as well as optimally combine simultaneous power flow from the battery storage system 200, the grid, and solar PV array 50 when, e.g., supplying power to electric vehicles.

In preferred embodiments, the battery storage system 200 includes a plurality of battery packs to achieve desired voltage levels and energy capacity. In one illustrative example, FIG. 9 shows a battery storage system 200 that includes 8 battery flat packs 210. As shown in FIG. 10, each battery flat pack 210, in turn, houses a plurality of battery modules 220 (e.g., 8 in this illustrative example), in an enclosure which, in a preferred embodiment, is IP67 rated water-proof. In preferred embodiments, each of the battery modules 220 can be liquid cooled if required to control temperature to maximize life and reliability, and integrates battery electronics and wiring, sensors, and an interface. In addition, each battery module 220 may include, e.g., cylindrical, pouch or prismatic lithium-ion battery cells to provide between about 72 and about 100 Volts, and a capacity ranging from about 2.6 to about 3.6 kWh. In an illustrative example, 288 small-capacity 18650 lithium-ion battery cells may be arranged as 12 parallel strings of 24 cells in series.

Together, the plurality of battery packs connect via cabling to a battery junction box, accessible from the surface, that in aggregate provides about 200 kWh storage and about 180 kW of power. The integrated vault and battery pack design, as described above, allows for the battery packs 210 to be easily installed in, and later removed from, the vault 400.

Advantageously, the inventive system enables use of a large battery system which can be discharged at lower C-rates, which preserves battery life while providing high power level. The C-Rate is a measure of how quickly the battery is charged or discharged relative to its maximum capacity in one hour. In this regard, high C-Rates shorten the lives of batteries, and the larger the battery, the lower the C-Rate for a particular power level. Therefore, operating at lower C-Rates extends the battery life. By using a large battery size (e.g., 200 kWh), the battery may be discharged at a fixed 200 kW in one hour, which equals 1 C, a generally-acceptable discharge rate for most battery chemistries.

Thus, embodiments of the inventions herein provide an integrated system, including an aboveground charging station and an underground vault and removable cover assembly which, in turn, houses a battery storage system, provides structural support for the aboveground charging station, provides convenient future access to the battery storage system and certain electronic/electrical components (e.g., for repair and/or replacement), and contains a local earth electrode network within the vault that provides comprehensive grounding to protect against electrical shocks. This innovative design enables safe and efficient installation of the integrated system in public parking and sidewalk areas, among others, thereby not only saving valuable real estate for property owners—as there are no batteries, cables, etc. running above ground—but also maximizing convenience and access to super-fast charging for EV drivers by providing the ability to install the charging station almost anywhere. In addition, the under-ground vault provides an ideal temperature environment for the battery system that, when installed above-ground, may be subject to (higher or lower) temperatures that impair the performance and operating life of batteries.

Moreover, by strategically installing the integrated system at the point-of-sale, the above advantages are made possible with minimal impact on the electric grid. This, in turn, allows the charging system—including the charging station and the battery storage system—to boost charging power to the high levels that are necessitated for fast charging, as well as optimally combine simultaneous power flow from the battery storage system, the grid, and solar PV array when, e.g., supplying power to electric vehicles. Thus, the integrated system is configured to draw power from available grid capacity, integrate solar PV, intelligently store and release electricity from the battery storage system in real time, charge EVs at super-fast speeds, and supply power to the grid. By decoupling the high power that is required for fast charging from the grid, the system enables interconnection with the grid at sufficiently low capacity and may connect behind-the-meter to premise electric distributions system(s), which minimizes the review and approval processes with the utility and authorities having jurisdiction (ALJs).

In short, super-fast charging is provided with minimal impact on the grid to enable an EV to fast-charge anytime, and from almost anywhere. The system's scalable, modular design enables the deployment of super-fast EV charging in convenient areas, provides for convenient access to individual components for repair and/or replacement, enables connection to circuits in commercial panel boards and/or solar combiner boxes, and integrates solar and value-added energy and grid management. Moreover, installation and operation of the system are more efficient and safer, as there are no batteries above ground, and no cables that must be run between the battery and the charging station above ground. The storage of the battery system underground, and immediately below the charging station, also provide for more stable power flow, as only a relatively short bus is required to transfer power between the battery storage system and the charging station. All of the foregoing provide devices, systems, and methods that uniquely overcome the existing art's shortcomings that preclude faster and broader deployment of clean energy solutions and power management systems and methods.

While the description above refers to particular embodiments of the present invention, it will be understood that many modifications may be made without departing from the spirit thereof. Additional steps and changes to the order of the algorithms can be made while still performing the key teachings of the present invention. Thus, the accompanying claims are intended to cover such modifications as would fall within the true scope and spirit of the present invention. The presently disclosed embodiments are, therefore, to be considered in all respects as illustrative and not restrictive, the scope of the invention being indicated by the appended claims rather than the foregoing description. All changes that come within the meaning of, and range of, equivalency of the claims are intended to be embraced therein.

What is claimed is:

1. A modular, integrated charging system for fast charging of a battery of an electric vehicle (EV), said system comprising:
    an under-ground stationary battery storage system;
    an above-ground charging station, said charging station being disposed substantially directly above said battery storage system, and including:
        a user interface;
        a bi-directional alternating current/direct current (AC/DC) power converter that is configured to receive and rectify AC power from an AC power grid into DC power;
        a high voltage (HV) direct current/direct current (DC/DC) converter;
        a high voltage (HV) DC bus configured to receive DC power from said bi-directional AC/DC power converter and from a solar photovoltaic (PV) array and to operatively connect said battery storage system and said HV DC/DC converter;
        a station charge controller that is off board said electric vehicle and regulates transfer of DC power between said HV DC/DC converter and said EV battery; and
        a charging system master controller that is configured to optimize and manage power flow among said AC power grid, said solar PV array, said battery storage system, and said EV battery,
    wherein the under-ground stationary battery storage system includes:
        a vault structure having walls, including at least a first pair of opposing side walls and a second pair of opposing side walls, the side walls defining an opening into an interior space in which a battery system of the under-ground stationary battery storage system is stored, the second pair of opposing side walls disposed on a front side and rear side of the charging system, respectively, and
        a cover assembly, the cover assembly is configured to be disposed atop the vault structure and to cover at least a portion of the opening,
        wherein the vault structure and the cover assembly of the under-ground stationary battery system are configured to provide structural support to the above-ground charging station that is disposed substantially directly above the under-ground battery storage system.

2. The system of claim 1, wherein the AC/DC power converter is further configured to invert DC power into AC power to transfer DC power from said battery storage system to said AC power grid.

3. The system of claim 1, further comprising a solar maximum power point tracker (MPPT) DC/DC converter for providing power from said solar PV array to said HV DC bus.

4. The system of claim 3, wherein said solar MPPT DC/DC converter is configured to optimize power generated by said solar PV array for distribution, via said HV DC bus, to one or more of the battery storage system, the HV DC/DC converter, and the bi-directional converter.

5. The system of claim 1, wherein said vault structure is made of reinforced concrete,
    wherein the cover assembly is a removable top cover assembly and said removable top cover assembly is configured to provide a water-tight seal and slip-resistant flooring.

6. The system of claim 5, wherein said above-ground charging station is removably secured to said top cover assembly.

7. The system of claim 1, wherein the above-ground charging station is configured to receive and rectify the AC power from the AC power grid into the DC power via the bi-directional alternating current/direct current (AC/DC) power converter, to connect to the solar photovoltaic (PV) array, to connect to the under-ground stationary battery storage system via the high voltage (HV) DC bus, and to connect to the battery of the electric vehicle (EV) via the high voltage (HV) direct current/direct current (DC/DC) converter, and
    wherein said above-ground charging station is configured to operatively connect to said AC power grid at a relatively low power panel and to provide high power levels required for said fast charging.

8. The system of claim 7, wherein said relatively low power panel is a behind-the-meter electric distribution panel.

9. The system of claim 1, wherein the bi-directional alternating current/direct current (AC/DC) power converter, the high voltage (HV) direct current/direct current (DC/DC) converter and the solar photovoltaic (PV) array are all configured to be connected to the high voltage (HV) DC bus, which, in turn, is directly connected to said battery storage system without an intervening power converter.

10. The system of claim 1, wherein said battery storage system includes a plurality of replaceable, modular battery packs.

11. The system of claim 10, wherein each of said plurality of battery packs includes a plurality of battery modules, and wherein each of said plurality of battery modules includes a plurality of battery cells.

12. The system of claim 1, wherein said battery storage system is configured to provide about 200 kWh of storage capacity and about 180 kW of power.

13. The system of claim 1, wherein the vault structure is a prefabricated vault,
wherein said battery system is housed within the prefabricated vault, and
wherein the cover assembly is configured to provide structural support to the above-ground charging system and provide a curb height in parking areas and to be level with grade in sidewalk areas so as to enable installation on the modular, integrated charging system on the sidewalk area or parking areas.

14. The system of claim 1, wherein each of said HV DC bus and battery storage system has a voltage level between about 600 Volts DC and about 800 Volts DC.

15. The system of claim 1, further comprising a structural support configured to be secured to the cover assembly and to support the above-ground charging station.

16. The system of claim 15, wherein the structural support and the cover assembly include openings therethrough to provide access for the high voltage (HV) DC bus to and from the under-ground battery storage system.

17. The system of claim 15, wherein the above-ground charging station includes a structural frame that is configured to be removably secured to the structural support.

18. The system of claim 1, wherein the cover assembly is configured to be removable from the vault structure so as to provide full access to the battery system of the under-ground stationary battery storage system stored in the interior space of the vault structure.

19. The system of claim 1, wherein the high voltage (HV) DC bus is configured to operate at a voltage of the under-ground stationary battery storage system.

20. The system of claim 1, wherein the bi-directional alternating current/direct current (AC/DC) power converter and the high voltage (HV) direct current/direct current (DC/DC) converter connect, operationally and/or physically, to the high voltage (HV) DC bus which, in turn, connects directly to the under-ground stationary battery storage system.

21. The system of claim 1, wherein the high voltage (HV) DC bus is configured to be of a relatively short length so as to position the bi-directional alternating current/direct current (AC/DC) power converter and the high voltage (HV) direct current/direct current (DC/DC) converter in close proximity to the under-ground stationary battery storage system.

* * * * *